(12) United States Patent
Carman et al.

(10) Patent No.: US 9,783,731 B1
(45) Date of Patent: Oct. 10, 2017

(54) DELAY ADDITIVE FOR OIL GELS

(71) Applicant: Baker Hughes, a GE company, LLC, Houston, TX (US)

(72) Inventors: Paul Carman, Spring, TX (US); John Mayor, Cypress, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 14/847,883

(22) Filed: Sep. 8, 2015

Related U.S. Application Data

(60) Provisional application No. 62/048,130, filed on Sep. 9, 2014.

(51) Int. Cl.
E21B 43/26 (2006.01)
C09K 8/64 (2006.01)

(52) U.S. Cl.
CPC .............. C09K 8/64 (2013.01); E21B 43/26 (2013.01)

(58) Field of Classification Search
CPC .................................. C09K 8/64; E21B 43/26
USPC ....................................................... 166/308.5
See application file for complete search history.

(56) References Cited

U.S. PATENT DOCUMENTS

| | | | |
|---|---|---|---|
| 4,113,631 A | 9/1978 | Thompson | |
| 4,395,373 A | 7/1983 | Login et al. | |
| 4,877,894 A | 10/1989 | Huddleston | |
| 5,016,711 A * | 5/1991 | Cowan | C04B 28/04 106/724 |
| 5,190,675 A | 3/1993 | Gross | |
| 5,304,620 A * | 4/1994 | Holtmyer | C09K 8/08 166/278 |
| 5,614,010 A | 3/1997 | Smith et al. | |
| 5,647,900 A | 7/1997 | Smith et al. | |
| 6,291,406 B1 | 9/2001 | Rose et al. | |
| 6,387,137 B1 | 5/2002 | Geib | |
| 2002/0147114 A1 | 10/2002 | Dobson, Sr. et al. | |
| 2003/0019627 A1 | 1/2003 | Qu et al. | |
| 2003/0045605 A1 | 3/2003 | Thompson | |
| 2004/0173354 A1 | 9/2004 | Hinkel et al. | |
| 2004/0209780 A1* | 10/2004 | Harris | C09K 8/602 507/117 |
| 2005/0077047 A1 | 4/2005 | Chatterji et al. | |
| 2005/0126778 A1 | 6/2005 | McElfresh et al. | |
| 2005/0252658 A1 | 11/2005 | Willingham et al. | |
| 2006/0211580 A1 | 9/2006 | Wang et al. | |
| 2008/0161207 A1 | 7/2008 | Welton et al. | |
| 2008/0269082 A1 | 10/2008 | Wilson et al. | |
| 2009/0301719 A1* | 12/2009 | Bull | C09K 8/64 166/280.2 |
| 2010/0075873 A1 | 3/2010 | Delgado et al. | |
| 2010/0122815 A1 | 5/2010 | Zamora et al. | |
| 2012/0024529 A1 | 2/2012 | Van Zanten et al. | |
| 2012/0138303 A1 | 6/2012 | Welton et al. | |

(Continued)

FOREIGN PATENT DOCUMENTS

WO    2005040552 A1    5/2005

*Primary Examiner* — Silvana Runyan
(74) *Attorney, Agent, or Firm* — Greenberg Traurig LLP

(57) ABSTRACT

A gel composition for use in treating subterranean formations is provided. The gel composition is a non-aqueous based oil gel system that can include a hydrocarbon liquid capable of gelation, a phosphate ester, and a cross-linking agent. The gel composition can include the oil gel which results from adding a phosphate ester, a crosslinking agent and a delay additive to the hydrocarbon liquid.

5 Claims, 8 Drawing Sheets

(56) References Cited

U.S. PATENT DOCUMENTS

| | | |
|---|---|---|
| 2012/0181027 A1 | 7/2012 | Welton et al. |
| 2012/0322700 A1 | 12/2012 | Crews et al. |
| 2013/0000911 A1* | 1/2013 | Reddy .................... C09K 8/035 166/305.1 |
| 2013/0189198 A1 | 7/2013 | Tamareselvy |

* cited by examiner

FIG. 6

| 14-01-0110 Super Rheogel Vortex Closure | | | |
|---|---|---|---|
| EOG Mineral Oil, 8gpt GO-64 | | | |
| XLO-5D (gpt) | V. Closure | Crown | Notes |
| 6 | :27 | :41 | |
| 8 | :27 | :38 | |
| 10 | :26 | :37 | |
| 12 | :28 | :49 | |
| 14 | :31 | :54 | |
| 16 | :30 | :58 | |

FIG. 7

| 14-01-0110 Super Rheogel Vortex Closure | | | |
|---|---|---|---|
| EOG Mineral Oil, 10gpt GO-64 | | | |
| XLO-5D (gpt) | V. Closure | Crown | Notes |
| 12 | :19 | :28 | |
| 14 | :18 | :31 | |
| 16 | :19 | :36 | |

FIG. 8

| GO-64 (gpt) | XLO-5D (gpt) | Aromax C/12 (gpt) | V. Closure | Crown |
|---|---|---|---|---|
| 8 | 12 | 0 | 0:28 | 0:49 |
| 8 | 12 | 8 | 1:30 | 2:30 |
| 8 | 12 | 10 | 3:30 | 5:30 |
| 8 | 14 | 0 | 0:31 | 0:54 |
| 8 | 14 | 10 | 2:50 | 10+ |
| 10 | 12 | 12 | 2:00 | 3:30 |
| 10 | 14 | 0 | 0:18 | 0:31 |
| 10 | 14 | 10 | 0:45 | 1:20 |
| 10 | 16 | 0 | 0:19 | 0:36 |
| 10 | 16 | 10 | 0:45 | 1:40 |
| 10 | 16 | 15 | 2:40 | 3:40 |

FIG. 9

| GO-64 (gpt) | XLO-5 (gpt) | Aromax C/12 (gpt) | V. Closure | Crown |
|---|---|---|---|---|
| 8 | 8 | 0 | 0:04 | 0:06 |
| 8 | 8 | 4 | 0:18 | 0:27 |
| 8 | 8 | 6 | 3:49 | 5:45 |
| 8 | 8 | 8 | 12:10 | 15+ |
| 10 | 10 | 0 | 0:04 | 0:06 |
| 10 | 10 | 6 | :18 | :26 |
| 10 | 10 | 8 | 1:17 | 3:23 |

FIG. 10

14-01-0110 Super Rheogel Vortex Closure
EOG Mineral Oil, 8gpt GO-64

| Chan Test | XLD-5 (gpt) | Aromox C/12 (gpt) | V. Closure | Crown | Notes |
|---|---|---|---|---|---|
| -16 | 8 | - | :4 | :5 | |
| | 8 | 4 | :18 | :27 | No amber color; fluid appeared normal at ambient temp |
| -18 | 8 | 6 | 3:49 | 5:45 | 15min in water bath (100°F) xlinked; distinctive amber Fe color but no Fe percipitating |
| | 8 | 8 | 12:10 | 12+ | ambient temperature, not much visc gain, distinctive amber Fe percipitate |
| | 8 | 10 | 10+ | 10+ | |

FIG. 11

14-01-0110 Super Rheogel Vortex Closure
EOG Mineral Oil, 10gpt GO-64

| Chan Test | XLD-5 (gpt) | Aromox C/12 (gpt) | V. Closure | Crown | Notes |
|---|---|---|---|---|---|
| -17 | 10 | - | :4 | :6 | |
| -20 | 10 | 6 | :18 | :26 | |
| | 10 | 8 | 1:17 | 3:23 | Slight amber color |

DELAY ADDITIVE FOR OIL GELS

RELATED APPLICATIONS

This application claims the benefit, and priority benefit, of U.S. Provisional Patent Application Ser. No. 62/048,130, filed Sep. 9, 2014, the disclosure and contents of which are incorporated by reference herein in their entirety.

FIELD OF THE INVENTION

The presently disclosed subject matter relates to a gel composition containing a delay additive and the use of the gel composition in oil and gas related applications.

BACKGROUND

Hydraulic fracturing is used to create fractures and increase connectivity between existing pores and natural channels in subterranean formations. Gelled liquid hydrocarbons are often used as fracturing fluids for this hydraulic fracturing. It is known in the art to gel liquid hydrocarbons by the introduction of a phosphate ester and a crosslinking agent. Gelling times and viscosities can be affected through the use of an enhancer such as an oxyalkylated amine or a blend of an oxyalkylated amine with another amine or a non-nitrogen-containing component. For example, certain embodiments of the aforementioned technology have been commercially sold by Ethox Chemical LLC under the trademarks XLO-5 and XLO-5D. Improvements in this field of technology are desired.

SUMMARY

In certain illustrative embodiments, a gel composition for use in a subterranean formation is provided. The gel composition can include a hydrocarbon liquid capable of gelation, a phosphate ester, a cross-linking agent and a delay additive. In certain illustrative embodiments, the delay additive can be an alkyl amine oxide. In certain illustrative embodiments, the alkyl amine oxide can be bis (2 hydroxyethyl)-cocoalkylamine oxide.

In another aspect, a method of treating a subterranean formation is provided. A gel composition can be provided which includes a hydrocarbon liquid capable of gelation, a phosphate ester and a cross-linking agent. A delay additive can be added to the gel composition. The gel composition can be injected into the subterranean formation. The gel composition can be cross-linked. In certain illustrative embodiments, the delay additive can be an alkyl amine oxide. In certain illustrative embodiments, the alkyl amine oxide can be bis (2 hydroxyethyl)-cocoalkylamine oxide.

According to the illustrative embodiments disclosed herein, the addition of the delay additive to the gel composition can prevent early gelation and result in predictable delay times without jeopardizing fluid stability.

BRIEF DESCRIPTION OF THE DRAWINGS

FIGS. 6-7 are tables showing vortex closure and crowning data for various prior art gel compositions.

FIGS. 8-11 are tables showing vortex closure and crowning data for various gel compositions containing a delay additive according to certain illustrative embodiments.

Figure 1:
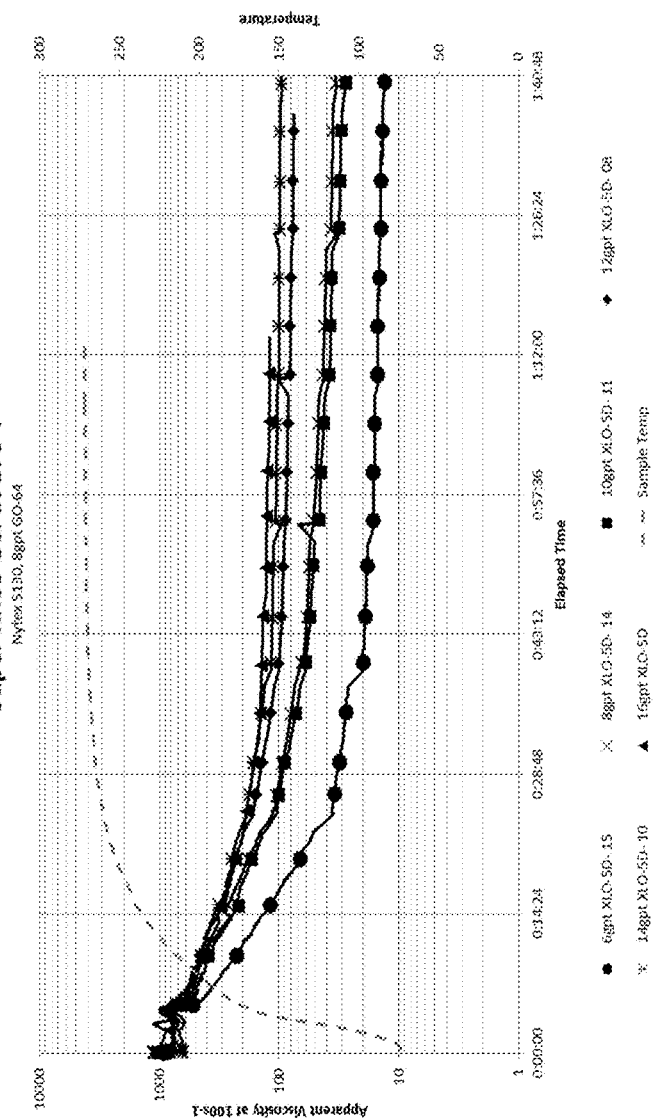
FIGS. 1-2 are graphs showing viscosity vs. time for various prior art gel compositions.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter generally relates to a gel composition for use in treating subterranean formations. In certain illustrative embodiments, the gel composition is a non-aqueous based oil gel system that can comprise a hydrocarbon liquid capable of gelation, a phosphate ester, and a cross-linking agent. More particularly, the gel composition can comprise the oil gel which results from adding a phosphate ester, a crosslinking agent and a delay additive to the hydrocarbon liquid. The gel composition can be injected into the subterranean formation and allowed to penetrate the formation. Preferably, the gel composition can be used in fracturing operations to create fractures and increase connectivity between existing pores and natural channels in the formation.

In certain illustrative embodiments, the hydrocarbon liquid can be one of the hydrocarbon liquids disclosed in U.S. Pat. Nos. 6,149,693 and 6,387,137, the disclosures and contents of which are incorporated by reference herein in their entirety. For example, the hydrocarbon liquid can be one or more of kerosene, diesel oil and crude oil, gasoline and other aliphatic and aromatic hydrocarbons such as octane, heptane, paraffinic oils, mineral oils and lubricating oils. Generally, the hydrocarbon liquid chosen for use in accordance with the gel composition will depend on the end-use application, but can comprise any hydrocarbon liquid.

In certain illustrative embodiments, the phosphate ester can be one of the phosphate esters disclosed in U.S. Pat. Nos. 6,149,693 and 6,387,137, the disclosures and contents of which are incorporated by reference herein in their entirety. For example, the phosphate ester is generally the reaction product of a pentavalent phosphorus compound and an alcohol. It is preferred that an oxyalkene such as oxyethylene, oxypropylene or oxybutylene is also present as a reactant in order to yield an ether phosphate ester.

Accordingly, the term "phosphate ester" as used herein includes ether phosphate esters such as described below. Thus, in certain illustrative embodiments, the phosphate ester of the present invention will thus contain one or more of the following structures:

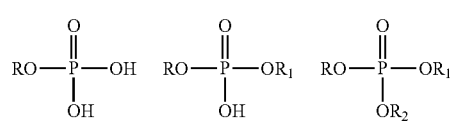

wherein R, $R_1$, and $R_2$ are independently $C_1$-$C_{18}$ alkyl, $C_6$ aryl, $C_1$-$C_{12}$ alkyl or dialkyl $C_6$ aryl, $C_1$-$C_{18}$ alkyl ether, $C_6$ aryl ether, or $C_1$-$C_{18}$ alkyl or dialkyl $C_6$ aryl ether where any R, $R_1$, or $R_2$ $C_1$-$C_{18}$ alkyl ether or $C_6$ aryl ether group has the following structures, respectively:

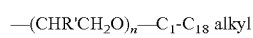

and

wherein R' is hydrogen, methyl or ethyl and n is an integer from 1 to 100.

Generally, it is preferred that the phosphate ester of the present invention is non-neutralized. However, depending on the enhancer employed, it is also within the scope of the invention to at least partially neutralize the phosphate ester. Examples of these phosphate esters are well known to those skilled in the art.

Various cross-linking agents are also well known to those skilled in the art. Examples of suitable cross-linking agents according to the presently disclosed subject matter can include the salt of a multivalent cation, preferably the salt of a multivalent metal cation. Although a wide variety of metal salts, such as aluminum salts and rare earth metal salts, are within the scope of the present invention, ferric salts are generally preferred. Preferred ferric salts include ferric nitrate and ferric sulfate. The amount of cross-linking agent used will typically vary depending upon the type of polymer and the degree of cross-linking desired.

The gel composition of the presently disclosed subject matter can further comprise a delay additive. In an illustrative embodiment, the delay additive can comprise alkyl amine oxide. For example, the alkyl amine oxide can be bis (2 hydroxyethyl)-cocoalkylamine oxide or cocobis (2-hydroxyethyl) amine oxide. The delay additive can be based on coco amine plus 2 EO, with EO meaning the amount of ethylene oxide added to the compound which usually makes the compound water soluble or oil soluble. In certain illustrative embodiments, the delay additive can comprise Aromox C/12, which is commercially available from Akzo Nobel N.V. In certain illustrative embodiments, the alkyl amine oxide can produced via a hydrogen peroxide reaction.

The delay additive will preferably be present in the gel composition of the presently disclosed subject matter in an amount sufficient to provide the desired predictability and stability for the downhole fluids. In certain illustrative embodiments, the gel composition is non-aqueous in nature.

Other additives suitable for use in operations in subterranean formations also may be added to the gel composition. These other additives can include, but are not limited to, biocide, scale inhibitor, corrosion inhibitor, paraffin inhibitor, asphaletene inhibitor, iron control and other commonly used oilfield chemicals and combinations thereof. A person having ordinary skill in the art, with the benefit of this disclosure, will know the type and amount of additive useful for a particular application and desired result.

Various methods of treating subterranean formations using gel compositions containing a delay additive are also disclosed herein. For example, disclosed herein is a method of treating a subterranean formation. A gel composition is provided comprising a hydrocarbon liquid, a phosphate ester, and a cross-linking agent. A delay additive can be added to the gel composition. In certain illustrative embodiments, the delay additive can comprise bis (2 hydroxyethyl)-cocoalkylamine oxide or cocobis (2-hydroxyethyl) amine oxide. The delay additive can be based on coco amine plus 2 EO. In certain illustrative embodiments, the delay additive can comprise Aromox C/12, which is commercially available from Akzo Nobel N.V. In certain illustrative embodiments, the alkyl amine oxide can produced via a hydrogen peroxide reaction.

The gel composition can be injected into the openings in the subterranean formation and cross-linked. Without wishing to be bound by theory, it is believed that the delay additive acts to stabilize the gel composition and thus delay the cross-linking process while not adversely affecting the ability of the gel composition to be injected into the openings.

To facilitate a better understanding of the presently disclosed subject matter, the following examples of certain aspects of certain embodiments are given. In no way should the following examples be read to limit, or define, the scope of the presently disclosed subject matter.

Examples

Figure 2:
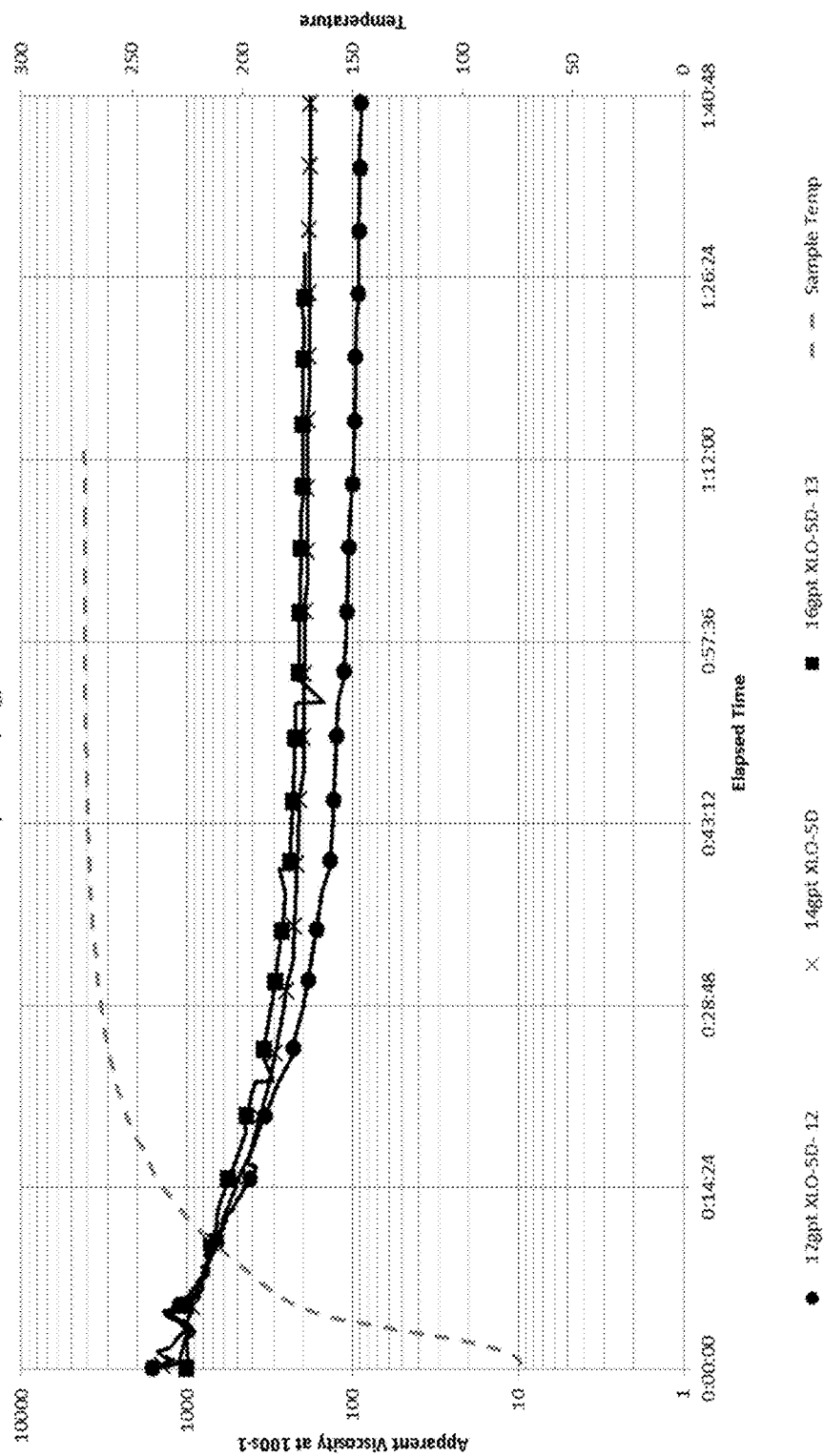
Figure 3:
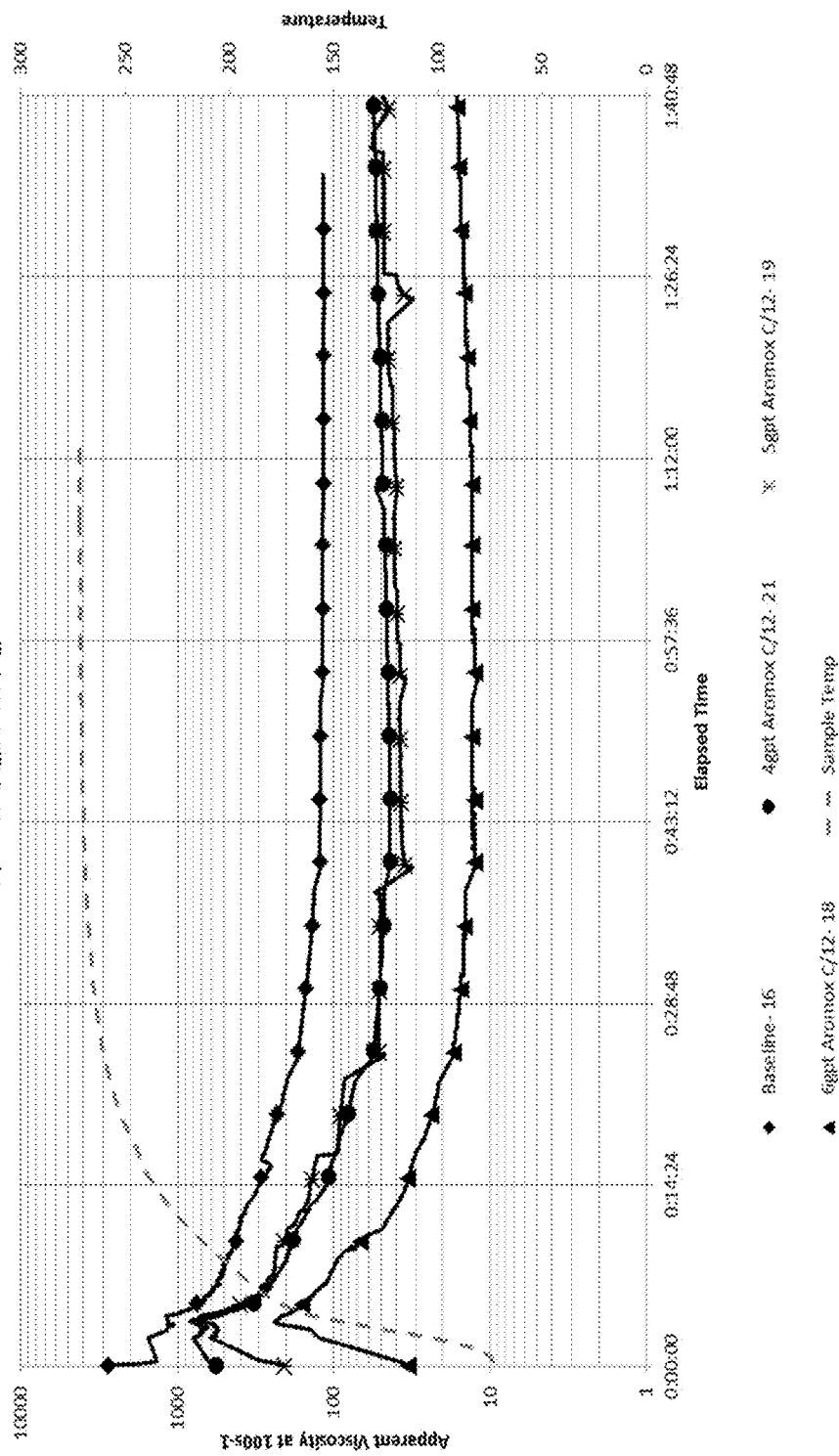
FIGS. 3-5 are graphs showing viscosity vs. time for various gel compositions containing a delay additive according to certain illustrative embodiments.
Figure 4:
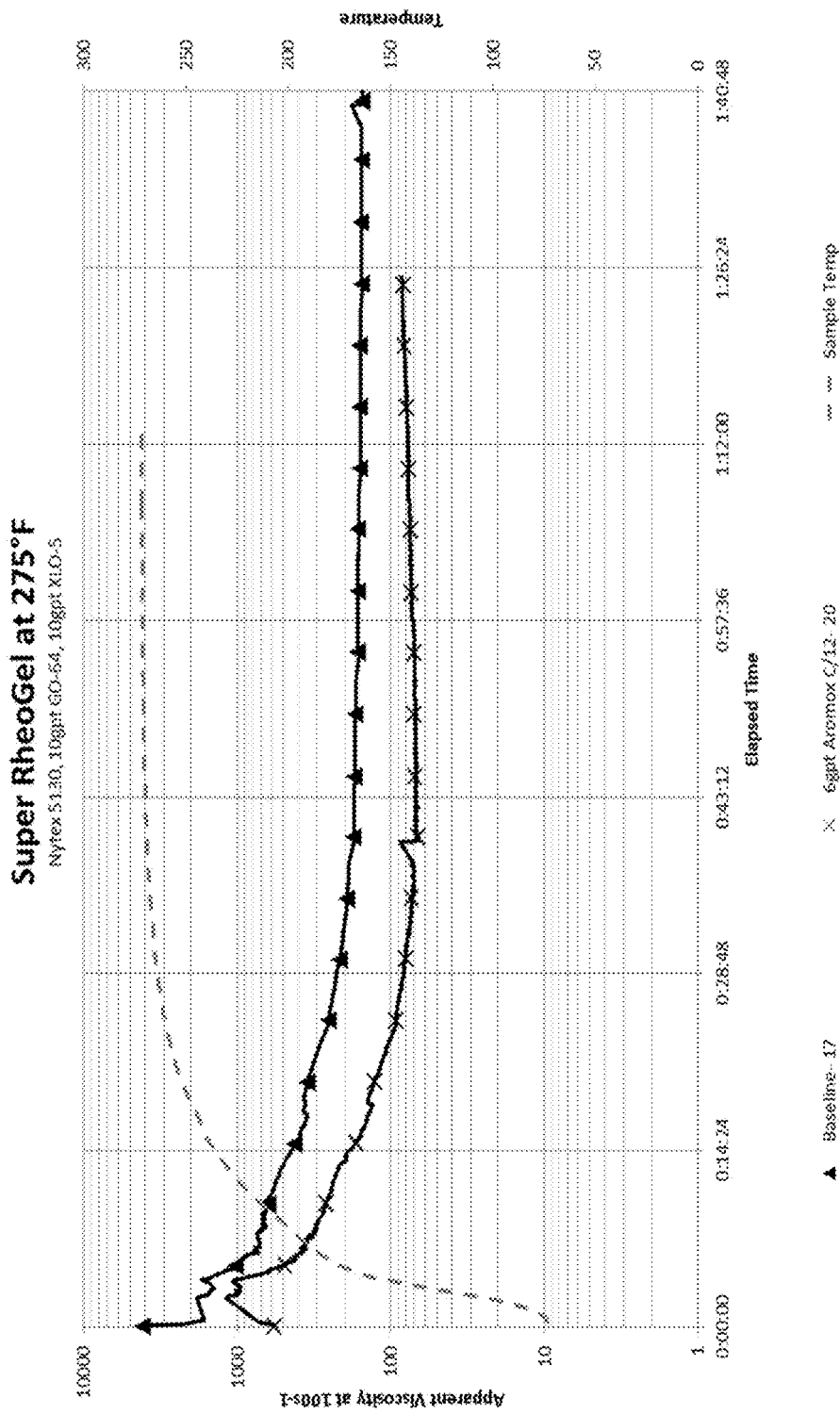
Figure 5:
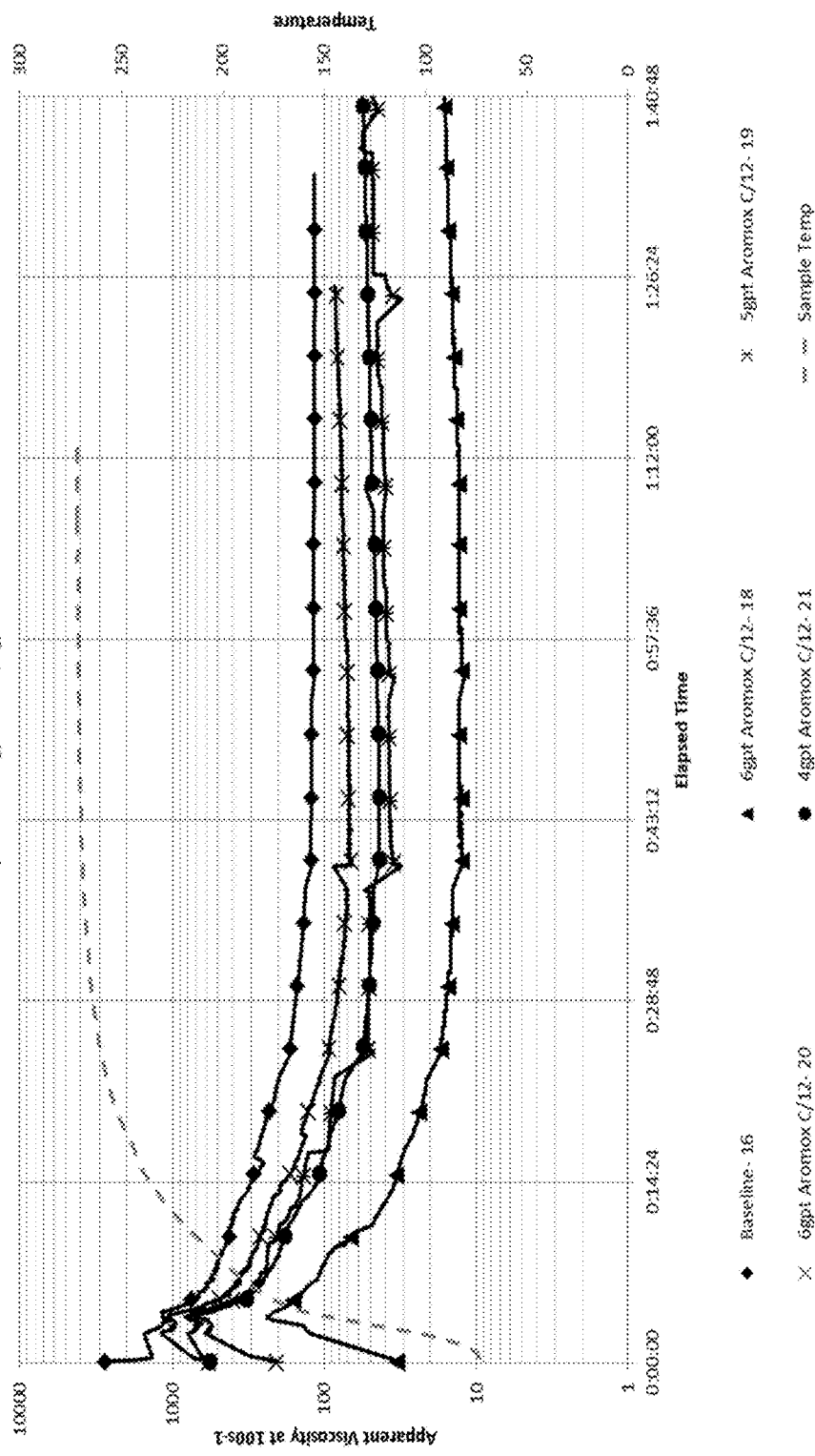

Aromox C/12 was added to XLO-5/XLO-5D to delay early gellation. Vortex closure and crown times were measured to determine maximum and minimum concentration. HPHT rheology was also measured to show fluid performance. Comparative results are shown in FIGS. 1-11 hereto.

FIGS. 1-11 show that the addition of the delay additive to the gel composition can effectively stabilize the gel composition and delay the onset of crosslinking to produce the desired viscosity for hydraulic fracturing.

The presently disclosed subject matter has a number of advantages over the prior art. Previously, iron crosslinked phospate ester oil gels formed very rapidly and at higher concentrations than necessary for high temperature applications. Also, the gels formed were very rigid and could not be pumped easily. The use of an alkyl amine oxide in the gel composition has been found to further inhibit gelation, while not adversely impacting the other desirable properties of the gel composition such as predictable delay times and fluid stability. In general, the presently disclosed gel compositions do not form too rapidly for high temperature applications. Further, the oil gels are not overly rigid and can pumped easily without reaching maximum pressure. Thus, the presently disclosed gel compositions provide greater predictability and stability than prior art gels.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method of enhancing production of oil and gas from a subterranean formation, the method comprising:
    adding a delay additive to a gel composition, the gel composition comprising a hydrocarbon liquid capable of gelation, a phosphate ester and a cross-linking agent, wherein the delay additive comprises alkyl amine oxide and delays the gelation of the gel composition and wherein the gel composition is non-aqueous;
    injecting the gel composition into an opening in the subterranean formation;
    cross-linking the gel composition; and
    treating the subterranean formation with the gel composition.

2. The method of claim 1, wherein the alkyl amine oxide comprises bis (2 hydroxyethyl)-cocoalkylamine oxide.

3. The method of claim 1, wherein the gel composition is used in the subterranean formation during fracturing operations.

4. The method of claim 3, wherein the gel composition is used as a fracturing fluid.

5. The method of claim 1, wherein the treating of the subterranean formation comprises enhancing the production of oil and gas from the subterranean formation.

* * * * *